United States Patent
Ogata et al.

(10) Patent No.: US 8,010,264 B2
(45) Date of Patent: Aug. 30, 2011

(54) CONTROL DEVICE FOR A HYBRID ELECTRIC VEHICLE

(75) Inventors: Makoto Ogata, Kanagawa (JP); Tatsuo Kiuchi, Kanagawa (JP)

(73) Assignee: Mitsubishi Fuso Truck and Bus Corporation, Kanagawa (JP)

( * ) Notice: Subject to any disclaimer, the term of this patent is extended or adjusted under 35 U.S.C. 154(b) by 1123 days.

(21) Appl. No.: 11/717,643

(22) Filed: Mar. 14, 2007

(65) Prior Publication Data
US 2007/0216312 A1 Sep. 20, 2007

(30) Foreign Application Priority Data

Mar. 14, 2006 (JP) .................................. 2006-068900
Mar. 17, 2006 (JP) .................................. 2006-074670

(51) Int. Cl.
*B60K 6/04* (2006.01)
*B60L 11/14* (2006.01)

(52) U.S. Cl. ............. 701/55; 701/22; 60/285; 180/65.7; 123/339.16

(58) Field of Classification Search .................. 180/65.7; 123/339.16; 700/6; 903/915
See application file for complete search history.

(56) References Cited

U.S. PATENT DOCUMENTS

| | | | |
|---|---|---|---|
| 5,722,502 A | | 3/1998 | Kubo |
| 5,873,426 A * | | 2/1999 | Tabata et al. .................. 180/65.7 |
| 6,098,733 A * | | 8/2000 | Ibaraki et al. ............... 180/65.28 |
| 6,428,444 B1 * | | 8/2002 | Tabata ............................. 477/3 |
| 6,817,964 B2 | | 11/2004 | Kayukawa et al. |
| 7,502,679 B2 | | 3/2009 | Tabata et al. |
| 2001/0003807 A1 * | | 6/2001 | Lee ................................. 701/51 |
| 2003/0085577 A1 * | | 5/2003 | Takaoka et al. ............. 290/40 C |
| 2005/0209046 A1 * | | 9/2005 | Potter ........................... 477/115 |
| 2006/0006008 A1 * | | 1/2006 | Brunemann et al. ......... 180/65.2 |
| 2006/0217229 A1 * | | 9/2006 | Ogata ............................. 477/15 |
| 2007/0205036 A1 * | | 9/2007 | Ogata et al. .................... 180/337 |

FOREIGN PATENT DOCUMENTS

| | | |
|---|---|---|
| DE | 696 10 360 T2 | 5/2001 |
| DE | 102 91 814 T5 | 4/2004 |
| DE | 10 2004 048 606 A1 | 4/2006 |
| DE | 10 2005 044 891 A1 | 4/2006 |
| JP | 61-253232 | 11/1986 |
| JP | 06-055941 | 3/1994 |
| JP | 09-009414 | 1/1997 |
| JP | 09009414 A * | 1/1997 |
| JP | 09-308007 | 11/1997 |
| JP | 2003-269597 | 9/2003 |
| JP | 2004-162670 | 6/2004 |
| JP | 2004-251452 | 9/2004 |
| JP | 2005-330834 | 12/2005 |

* cited by examiner

*Primary Examiner* — Thomas G Black
*Assistant Examiner* — Lin B Olsen
(74) *Attorney, Agent, or Firm* — Jacobson Holman PLLC (57) ABSTRACT

A hybrid electric vehicle is arranged such that a driving force of an engine and a driving force of an electric motor can be transmitted to driving wheels through an automatic transmission having a plurality of forward gears. When it is detected that the vehicle is in a predetermined state in which it is difficult for the electric motor to output an upper limit torque predetermined as a generable maximum torque, a vehicle ECU controls the automatic transmission using a gear shift map configured such that the automatic transmission is downshifted earlier in accordance with a change in the operating state of the vehicle and upshifted later in accordance with a change in the operating state of the vehicle in comparison with a gear shift map that is used when it is not detected that the vehicle is in the predetermined state.

6 Claims, 5 Drawing Sheets

CONTROL DEVICE FOR A HYBRID ELECTRIC VEHICLE

BACKGROUND OF THE INVENTION

1. Field of the Invention

The present invention relates to a control device for a hybrid electric vehicle, and in particular, to a control device for a hybrid electric vehicle arranged such that a driving force of an engine and a driving force of an electric motor can be respectively transmitted to driving wheels of the vehicle.

2. Description of the Related Art

Conventionally, a so-called parallel hybrid electric vehicle capable of transmitting a driving force of an engine and a driving force of a motor to driving wheels respectively, have been developed and are in practical use.

As an example of such a parallel hybrid electric vehicle, Unexamined Japanese Patent Publication No. 2004-162670 (hereinafter referred to as Patent Document 1) proposes a hybrid electric vehicle that is arranged so that a driving state can be switched between a state in which a clutch is engaged and driving forces can be transmitted to driving wheels from both an engine and an electric motor, and a state in which the clutch is disengaged and only the driving force from the electric motor can be transmitted to the driving wheels.

With the hybrid electric vehicle described in Patent Document 1, in the event that an output torque of the electric motor is limited by whatever reason and the output torque of the electric motor is insufficient with respect to a required torque necessary for traveling the vehicle, the engine is started up so that output torque may also be obtained from the engine in order to secure necessary driving force.

In addition, with the hybrid electric vehicle described in Patent Document 1, in the event that regenerative braking torque is limited during regenerative braking, revolution speed of the electric motor is increased by changing a gear ratio of a transmission. In this manner, the electric motor is protected by reducing the torque of the electric motor.

As described above, with the hybrid electric vehicle described in Patent Document 1, in the event that the torque of the electric motor is limited during driving of the vehicle and the torque of the electric motor is insufficient with respect to the required torque, the engine is started up in order to compensate for the deficiency. Therefore, the engine will be repetitively started-up and stopped, thereby giving rise to a problem in that vibration and noise are generated from such start-up and stopping of the engine. In addition, there is a problem in that a time lag occurs between a start-up of the engine and the generation of the required torque, which results in a temporary shortage of driving force. These problems cause a decline in the driving feeling of the hybrid electric vehicle described in Patent Document 1.

In particular, upon start-up of the vehicle, there is an increased likelihood that the electric motor will be unable to perform a smooth start-up by itself, and the decline of the driving feeling due to the above-mentioned deficiency in driving force will become prominent.

SUMMARY OF THE INVENTION

An aspect of the present invention is directed to a control device for a hybrid electric vehicle arranged such that a driving force of an engine and a driving force of an electric motor can be transmitted to driving wheels through an automatic transmission having a plurality of forward gears, the control device comprising: an output limit detection means for detecting that the vehicle is in a predetermined state in which it is difficult for the electric motor to output an upper limit torque predetermined as a generable maximum torque; and a control means for controlling a gear shift of the automatic transmission according to a change in an operating state of the vehicle based on a predetermined gear shift map; wherein when it is detected by the output limit detection means that the vehicle is in the predetermined state, the control means controls the automatic transmission using a gear shift map configured such that the automatic transmission is downshifted earlier in accordance with a change in the operating state of the vehicle and upshifted later in accordance with a change in the operating state of the vehicle in comparison to a gear shift map that is used when the output limit detection means does not detect that the vehicle is in the predetermined state.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will now be described with reference to the attached drawings.

Figure 1:
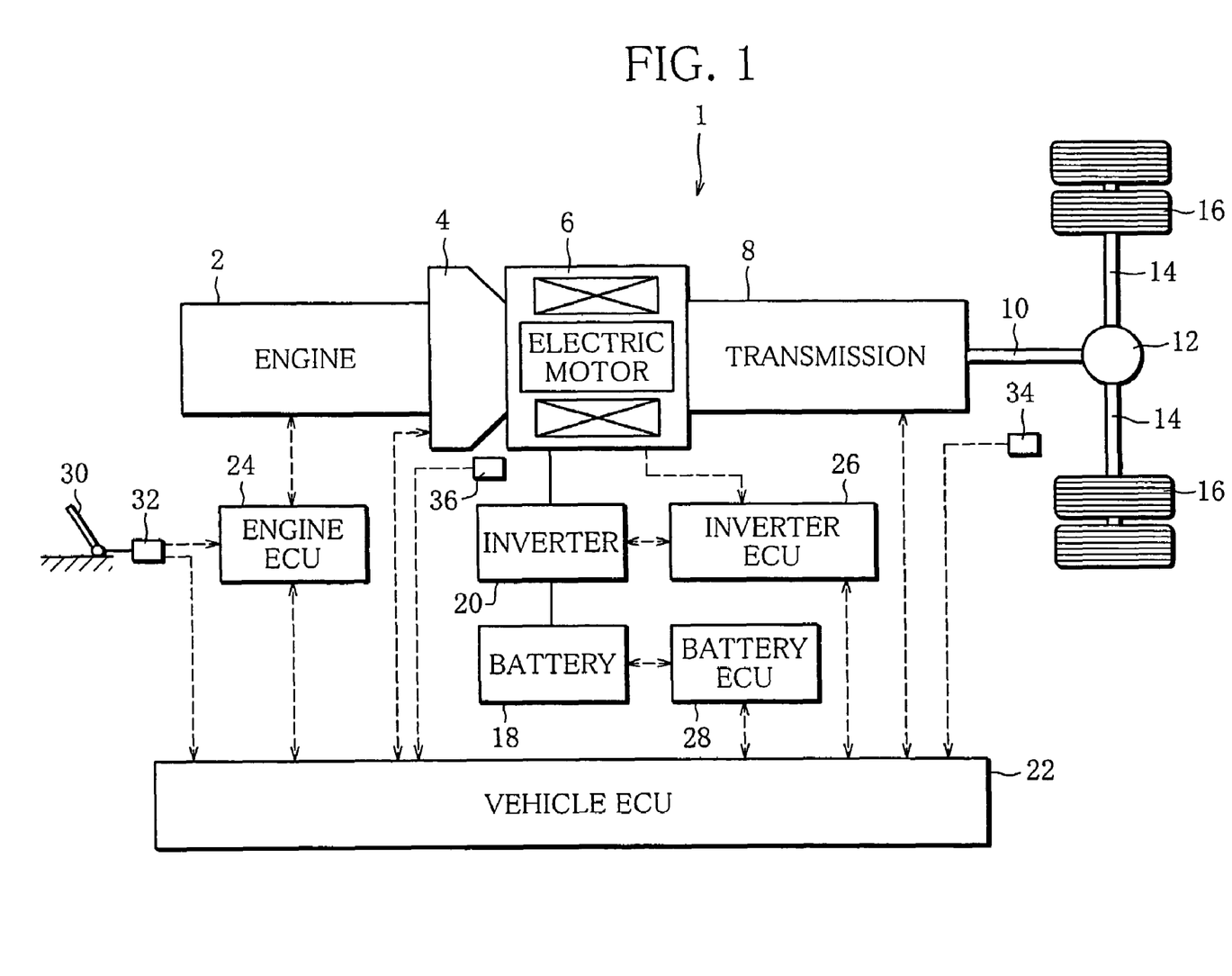
FIG. 1 is a diagram showing a substantial part of a hybrid electric vehicle having a control device according to one embodiment of the present invention.

FIG. 1 is a diagram showing a substantial part of a hybrid electric vehicle 1 to which the present invention is applied.

An input shaft of a clutch 4 is coupled to an output shaft of an engine 2, which is a diesel engine. An output shaft of the clutch 4 is coupled to an input shaft of an automatic transmission (hereinafter referred to as transmission) 8 having five forward gears (hereinafter referred to simply as gears) through a rotary shaft of a permanent-magnetic synchronous motor (hereinafter referred to as electric motor) 6. An output shaft of the transmission 8 is connected to left and right driving wheels 16 through a propeller shaft 10, a differential gear unit 12 and driving shafts 14.

Therefore, when the clutch 4 is engaged, both the output shaft of the engine 2 and the rotary shaft of the electric motor 6 can be mechanically connected with the driving wheels 16. On the other hand, when the clutch 4 is disengaged, only the rotary shaft of the electric motor 6 can be mechanically connected with the driving wheels 16.

The electric motor 6 is operated as a motor when DC power stored in a battery 18 is supplied to the electric motor 6 after being converted into AC power by an inverter 20. A driving torque of the electric motor 6 is transmitted to the driving wheels 16 after being shifted to a proper speed by the transmission 8. At the time of deceleration of the vehicle, the electric motor 6 is operated as a generator. Kinetic energy created by the revolution of the driving wheels 16 is transmitted to the electric motor 6 through the transmission 8 to be converted into AC power, thereby producing a decelerating torque caused by regenerative braking force. This AC power is then converted into DC power by the inverter 20 and is then charged to the battery 18. In this manner, the kinetic energy created by the revolution of the driving wheels 16 is retrieved as electrical energy.

Meanwhile, a driving torque of the engine 2 is transmitted to the transmission 8 through the rotary shaft of the electric motor 6 when the clutch 4 is engaged. After being shifted to a proper speed, the driving torque of the engine 2 is transmitted to the driving wheels 16. Therefore, in a case where the electric motor 6 is operated as a motor while the driving torque of the engine 2 is transmitted to the driving wheels 16, both the driving torque of the engine 2 and the driving torque of the electric motor 6 are transmitted to the driving wheels 16. In other words, a part of the driving torque to be transmitted to the driving wheels 16 to drive the vehicle is supplied from the engine 2, and at the same time, the remainder of the driving torque is supplied from the electric motor 6.

If a storage rate (hereinafter referred to as SOC) of the battery 18 lowers and the battery 18 then needs to be charged, the electric motor 6 is operated as a generator. Moreover, the electric motor 6 is driven by using a part of the driving torque of the engine 2, to thereby carry out power generation. The AC power thus generated is converted into DC power by the inverter 20, and the battery 18 is charged with this DC power.

A vehicle ECU (control means) 22 performs engagement/disengagement control of the clutch 4 and gear shift control of the transmission 8 according to an operating state of the vehicle, an operating state of the engine 2, and information from an engine ECU 24, an inverter ECU 26, a battery ECU (storage rate detection means) 28, etc. In addition, the vehicle ECU 22 performs an integrated control for appropriately controlling the engine 2 and the electric motor 6 in accordance with states of the above-mentioned controls, and the various kinds of states, such as start-up, acceleration and deceleration of the vehicle.

The hybrid electric vehicle 1 is provided with an accelerator opening sensor 32 that detects the depression amount of an accelerator pedal 30, a vehicle speed sensor 34 that detects the traveling speed of the vehicle, and a revolution speed sensor (revolution speed detection means) 36 that detects the revolution speed of the electric motor 6. When performing the controls described above, the vehicle ECU 22 calculates a required driving torque and a required decelerating torque based on the detection results supplied from the accelerator opening sensor 32, the vehicle speed sensor 34 and the revolution speed sensor 36. Furthermore, the vehicle ECU 22 sets a torque to be generated by the engine 2 and a torque to be generated by the electric motor 6, based on the required driving torque and the required decelerating torque.

The engine ECU 24 performs various kinds of controls necessary for the operation of the engine 2 per se, including start/stop control and idling control of the engine 2, regeneration control of an exhaust emission purification device (not shown), and the like. In addition, the engine ECU 24 controls fuel injection quantity, fuel injection timing, etc. of the engine 2 so that the engine 2 generates the torque required from the engine 2, which has been set by the vehicle ECU 22.

The inverter ECU 26 controls the inverter 20 based on the torque to be generated by the electric motor 6, which has been set by the vehicle ECU 22, and thereby controls the electric motor 6 to be operated as a motor or a generator. The inverter ECU 26 receives output signals from temperature sensors (not shown) that detect the temperatures of the electric motor 6 and the inverter 20, and outputs the detection results of the temperatures of the electric motor 6 and the inverter 20 to the vehicle ECU 22. Furthermore, the inverter ECU 26 monitors operating states of the electric motor 6 and the inverter 20, and sends information of the monitoring results to the vehicle ECU 22.

The battery ECU 28 detects the temperature of the battery 18, the voltage of the battery 18, and the current flowing between the inverter 20 and the battery 18, etc. In addition, the battery ECU 28 obtains the SOC of the battery 18 from these detection results, and monitors the operating state of the battery 18. The battery ECU 28 sends the obtained SOC and operating state of the battery 18 to the vehicle ECU 22 together with the detection results.

The hybrid electric vehicle 1 is configured as described above, in which the engine 2 and the engine ECU 24 constitute an engine output system, while the electric motor 6, the battery 18, the inverter 20, the inverter ECU 26 and the battery ECU 28 constitute a motor output system.

With the hybrid electric vehicle 1 thus configured, an outline of controls performed mainly by the vehicle ECU 22, in the hybrid electric vehicle 1 configured as described above, to make the vehicle travel is as follows:

First, it is assumed that the vehicle is at rest with the engine 2 stopped. When a driver performs a start-up operation of the engine 2 using a starter switch (not shown) with a shift change lever (not shown) in a neutral position, the vehicle ECU 22 confirms that the transmission 8 is in a neutral position so that the electric motor 6 and the driving wheels 16 are mechanically disconnected, and that the clutch 4 is engaged. Then the vehicle ECU 22 indicates to the inverter ECU 26 a driving torque of the electric motor 6 required for starting the engine 2, and commands the engine ECU 24 to operate the engine 2.

The inverter ECU 26 operates the electric motor 6 as a motor to generate a driving torque based on the indication from the vehicle ECU 22, thereby cranking the engine 2. At this point, the engine ECU 24 starts fuel supply to the engine 2, thereby causing the engine 2 to start. After the start-up of the engine 2, the engine 2 enters idling operation.

After the engine 2 is started in this manner, the engine 2 is in an idle operational state when the vehicle is at rest. When the driver operates the change lever to a drive position or the like, the vehicle ECU 22 disengages the clutch 4 and at the same time sets the gear of the transmission 8 to a gear for start-up of the vehicle according to a gear shift map. Furthermore, when the driver steps on the accelerator pedal 30, the vehicle ECU 22 obtains a driving torque to be transmitted to the driving wheels 16 to start traveling of the vehicle, in accordance with a depression amount of the accelerator pedal 30 detected by the accelerator opening sensor 32. The vehicle ECU 22 sets an output torque of the electric motor 6 based on the obtained driving torque and the gear currently used in the transmission 8.

The inverter ECU 26 controls the inverter 20 according to the torque set by the vehicle ECU 22, so that DC power of the battery 18 is converted into AC power by the inverter 20 and supplied to the electric motor 6. Supplied with AC power, the electric motor 6 is operated as a motor to generate the driving torque. The driving torque of the electric motor 6 is transmitted to the driving wheels 16 through the transmission 8, and the vehicle thereby starts traveling.

When the vehicle accelerates after the start of traveling, and the revolution speed of the electric motor 6 rises to the vicinity of the idling speed of the engine 2, it is possible to engage the clutch 4 to transmit the driving force of the engine 2 to the driving wheels 16. The vehicle ECU 22 obtains a driving torque to be transmitted to the driving wheels 16 for further acceleration and subsequent traveling of the vehicle. The vehicle ECU 22 then appropriately divides the driving torque into an output torque of the engine 2 and an output torque of the electric motor 6 according to the gear currently used in the transmission 8 and the operating state of the vehicle, and indicates to the engine ECU 24 and the inverter ECU 26 the divided output torques respectively. At this point, the vehicle ECU 22 controls the transmission 8 and the clutch 4 as necessary.

Upon receipt of the output torques set by the vehicle ECU 22, the engine ECU 24 and the inverter ECU 26 respectively control the engine 2 and the electric motor 6. As a result, when the clutch 4 is engaged, the output torques of the engine 2 and the electric motor 6 are transmitted to the driving wheels 16 through the transmission 8, and thereby the vehicle travels. On the other hand, when the clutch 4 is disengaged, the output torque generated by the electric motor 6 is transmitted to the driving wheels 16 through the transmission 8, and thereby the vehicle travels.

Additionally, at this point, the vehicle ECU 22 suitably performs a gear shift control of the transmission 8 in accordance with operating states of the vehicle such as the depression amount of the accelerator pedal 30 detected by the accelerator opening sensor 32 and the traveling speed detected by the vehicle speed sensor 34. Furthermore, in accordance with the switching of speed ranges, the vehicle ECU 22 instructs the engine ECU 24 and the inverter ECU 26 to appropriately control torques of the engine 2 and the electric motor 6 in response to the gear shift of the transmission 8, and at the same time, controls engagement/disengagement of the clutch 4.

An upper limit torque, which is maximum torque continuously generable by the electric motor 6, is determined depending on the specifications of the electric motor 6. When causing the electric motor 6 to generate torque, the vehicle ECU 22 controls the electric motor 6 so that the output torque of the electric motor 6 does not exceed the upper limit torque.

However, in cases in which the SOC of the battery 18 lowers extremely for some reasons, or the temperature of the battery 18 or the electric motor 6 lowers significantly in cold climates, an output torque equivalent to the upper limit torque may not be obtained from the electric motor 6. Additionally, in a case where the temperatures of the battery 18, the electric motor 6 or the inverter 20 rises excessively, output of the electric motor 6 is limited to a limited torque that is lower than the upper limit torque in order to protect the battery 18, the electric motor 6 or the inverter 20.

To ensure that required driving force is transmitted to the driving wheels 16 even in these cases, the vehicle ECU 22 switches the gear shift maps that are used in performing a gear shift control of the transmission 8 according to operating states of the vehicle.

In addition, the vehicle ECU 22 monitors whether the motor output system has a failure based on information sent from the inverter ECU 26 and the battery ECU 28. Failures of the motor output system include a failure of an inverter circuit (not shown) used in the inverter 20, defective cells in the battery 18 and the like. If the motor output system has such a failure, the vehicle ECU 22 instructs the inverter ECU 26 to cut off the electrical connection between the battery 18 and the inverter 20. In response to this instruction, the inverter ECU 26 controls the inverter 20 to cut off the electrical connection between the battery 18 and the inverter 20.

Since the electrical connection between the battery 18 and the inverter 20 is cut off in this manner, the electric motor 6 is operated neither as a motor nor as a generator. Therefore, when the clutch 4 is engaged, the electric motor 6 is driven by the driving force to rotate together with the engine 2.

As the electric motor 6 ceases to be operated, it is unable to transmit a driving force from the motor output system to the driving wheels 16. In order to arrange so that a required driving force can be transmitted to the driving wheels 16 even in these cases, depending on whether or not the motor output system has a failure, the vehicle ECU 22 switches the gear shift maps that are used in performing a gear shift control of the transmission 8 according to operating states of the vehicle.

As described above, the vehicle ECU 22 switches the gear shift maps depending on whether or not the motor output system has a failure in addition to whether or not an output torque equivalent to the upper limit torque can be obtained from the electric motor 6.

Figure 2:
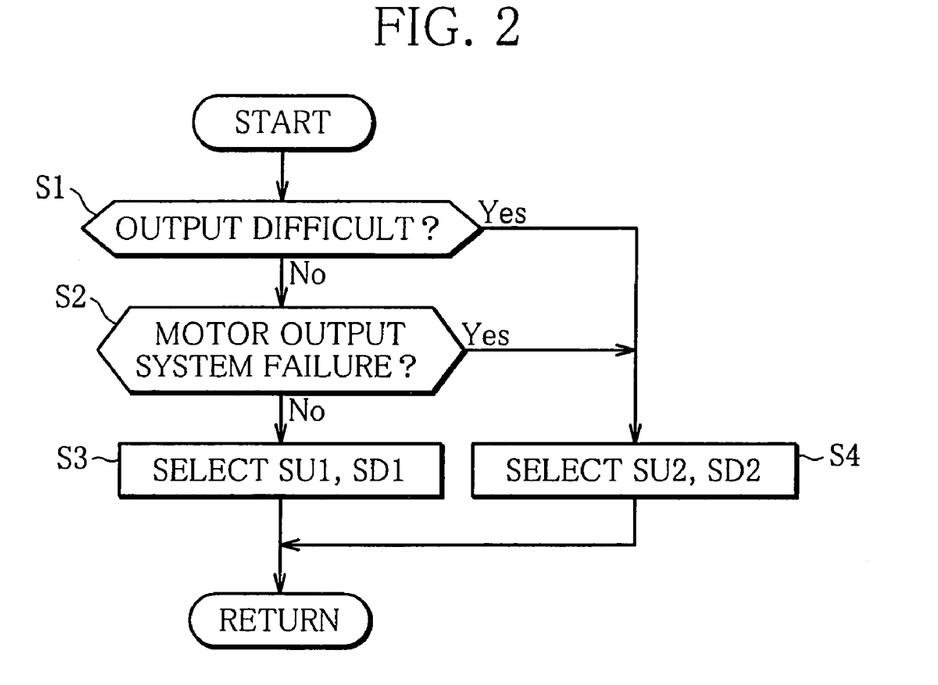
FIG. 2 is a flowchart showing a switching control of gear shift maps performed in the hybrid electric vehicle shown in FIG. 1.

Such switching control of the gear shift maps is performed by the vehicle ECU 22 at predetermined control periods according to a flowchart shown in FIG. 2.

Upon commencement of the switching control, in Step S1 (output limit detection means), the vehicle ECU 22 judges whether or not the electric motor 6 can output the upper limit torque.

In cases where a drastic drop of the SOC of the battery 18 or a significant drop of the temperature of the battery 18 is detected based on the information sent from the battery ECU 28 as described above, the vehicle ECU 22 limits the output torque of the electric motor 6 to a limited torque that is lower than the upper limit torque, in accordance with each case. Additionally, also in cases where an excessive rise in the temperatures of the battery 18, the electric motor 6 or the inverter 20 is detected based on the information sent from the battery ECU 28 or the inverter ECU 26, the vehicle ECU 22 limits the output torque of the electric motor 6 to a limited torque that is lower than the upper limit torque, in accordance with each case. The vehicle ECU 22 judges in Step S1 that it is difficult for the electric motor 6 to output the upper limit torque when the motor output system is in a state where such limitations are imposed on the output torque of the electric motor 6.

If the vehicle ECU 22 judges in Step S1 that the electric motor 6 is capable of outputting the upper limit torque, the vehicle ECU 22 judges in Step S2 (failure detection means), based on the information from the inverter ECU 26 and the battery 28, whether or not the motor output system has a failure.

If the vehicle ECU 22 judges in Step S2 that the motor output system has no failure or, in other words, that the motor output system is normal, the vehicle ECU 22 advances the process to Step S3. In Step S3, the vehicle ECU 22 selects a gear shift map SU1 for upshift and a gear shift map SD1 for downshift, and then concludes the present control period.

On the other hand, if the vehicle ECU 22 judges in Step S1 that it is difficult for the electric motor 6 to output the upper limit torque or judges in Step S2 that the motor output system has a failure, the vehicle ECU 22 advances the process to Step S4. In Step S4, the vehicle ECU 22 selects a gear shift map SU2 for upshift and a gear shift map SD2 for downshift, and then concludes the present control period.

In the next control period, the vehicle ECU 22 again performs the switching control from Step S1, and selects gear shift maps in either Step S3 or Step S4, as described above.

By repeating the switching control for each control period in this manner, the vehicle ECU 22 appropriately selects a gear shift map for upshift and a gear shift map for downshift, depending on whether or not it is difficult for the electric motor 6 to output the upper limit torque and whether or not the motor output system has a failure. More specifically, if the vehicle ECU 22 judges that the electric motor 6 is capable of outputting the upper limit torque and the motor output system is normal, the gear shift map SU1 for upshift and the gear shift map SD1 for downshift are selected. On the other hand, if the vehicle ECU 22 judges that either it is difficult for the electric motor 6 to output the upper limit torque or the motor output system has a failure, the gear shift map SU2 for upshift and the gear shift map SD2 for downshift are selected.

All of these gear shift maps are used when the transmission 8 is upshifted/downshifted according to the depression amount of the accelerator pedal 30 detected by the accelerator opening sensor 32 and the traveling speed detected by the vehicle speed sensor 34.

Figure 3:
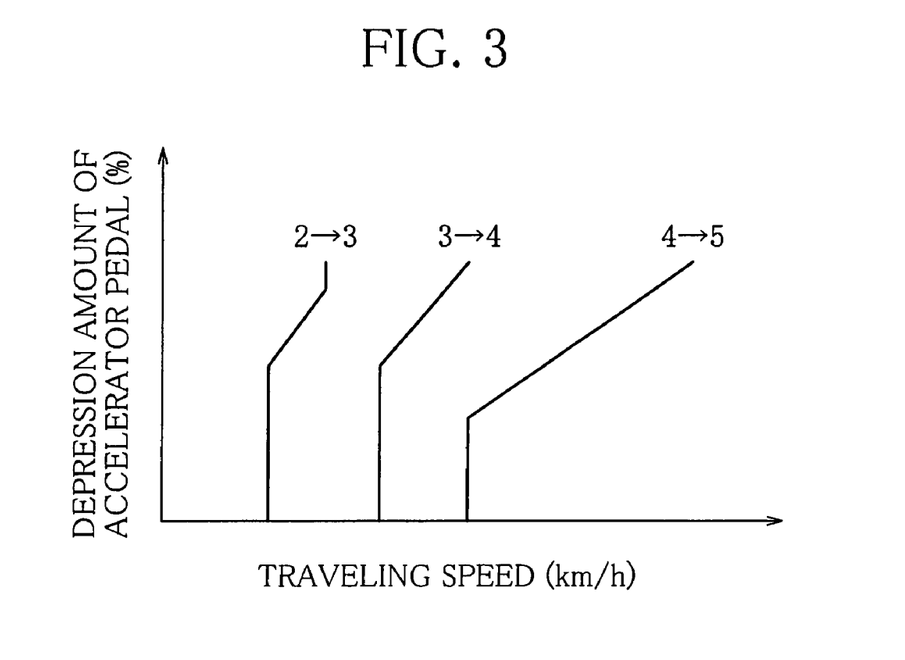
FIG. 3 is a diagram showing a gear shift map SU1 for upshift.

Among these gear shift maps, the gear shift map SU1 for upshift is shown in FIG. 3. As shown in FIG. 3, for the gear shift map SU1, an upshift line (2→3) from a second gear to a third gear, an upshift line (3→4) from the third gear to a fourth gear, and an upshift line (4→5) from the fourth gear to a fifth speed are set in accordance with the depression amount of the accelerator pedal 30 and the traveling speed of the vehicle.

Therefore, when a change in the operating state of the vehicle causes a point determined by the depression amount of the accelerator pedal 30 and the traveling speed to move across the upshift line (2→3) from the second gear to the third gear from left to right on the diagram, the vehicle ECU 22 upshifts the transmission 8 from the second gear to the third gear. The procedures for the upshift line (3→4) from the third gear to the fourth gear and the upshift line (4→5) from the fourth gear to the fifth gear are similar to that of the upshift line (2→3) from the second gear to the third gear. In other words, when a point determined by the depression amount of the accelerator pedal 30 and the traveling speed moves across each upshift line from left to right of the diagram, a corresponding upshift is performed.

Since the output torque of the electric motor 6 is used in combination with the output torque of the engine 2, the gear shift map SU1 for upshift is set so that the transmission 8 is upshifted earlier in comparison with a gear shift map of an automatic transmission that is applied to a vehicle not equipped with an electric motor and uses an engine as a sole driving source. As a result, when both the engine 2 and the electric motor 6 are used for driving the vehicle, it is possible to improve fuel efficiency of the engine 2 with ensuring the driving force necessary for driving the vehicle.

In addition, when the electric motor 6 is capable of outputting the upper limit torque and the motor output system is normal, the lowest forward gear is the second gear (i.e., the mechanically second lowest possible gear) as shown in FIG. 3, and upon start-up of the vehicle, the vehicle ECU 22 sets the gear of the transmission 8 to the second gear (the mechanically second lowest possible gear) and causes the vehicle to start traveling. Therefore, in the present embodiment, the second gear (the mechanically second lowest possible gear) corresponds to the second gear (the lowest gear actionable due to the first shift map that is used when the output limit detection unit determines that the generable output torque of the electric motor is not limited to the limited torque by the output limiting unit) of the present invention.

Figure 4:
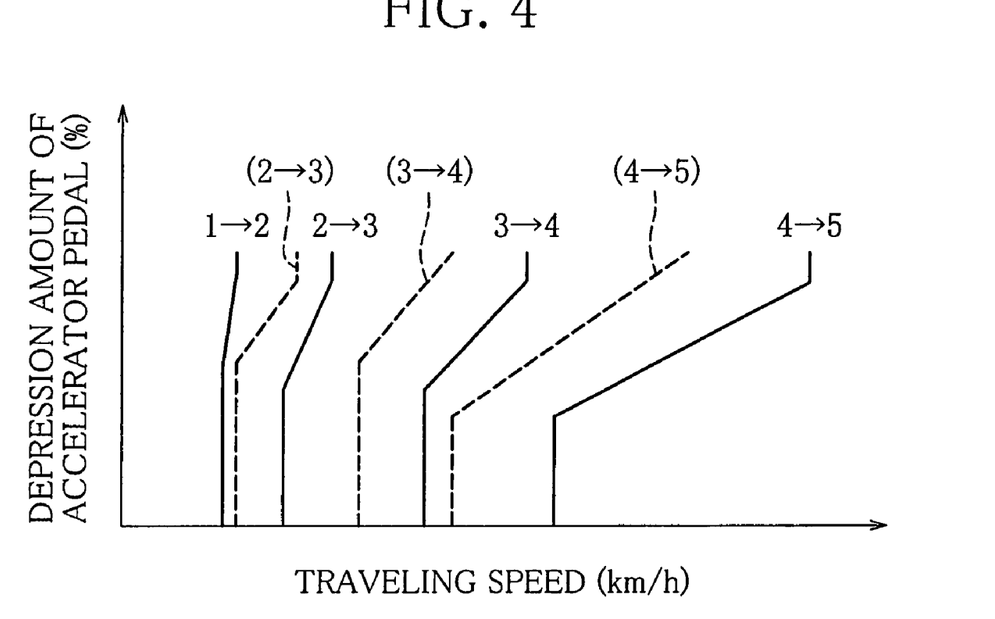
FIG. 4 is a diagram showing a gear shift map SU2 for upshift.

On the other hand, FIG. 4 shows the gear shift map SU2 for upshift. For the gear shift map SU2, as indicated by the solid lines in FIG. 4, an upshift line (1>2) from a first gear (i.e., the mechanically lowest possible gear) to the second gear (the mechanically second lowest possible gear), an upshift line (2>3) from the second gear (the mechanically second lowest possible gear) to the third gear, an upshift line (3>4) from the third gear to the fourth gear, and an upshift line (4>5) from the fourth gear to the fifth gear are set in accordance with the depression amount of the accelerator pedal 30 and the traveling speed of the vehicle.

When this gear shift map is used, the transmission 8 is upshifted in the same manner as the case where the gear shift map SU1 for upshift is used. However, as shown in FIG. 4, the upshift line (1>2) from the first gear (the mechanically lowest possible gear) to the second gear (the mechanically second lowest possible gear), which is not included in the gear shift map SU1 for upshift, is set for the gear shift map SU2 for upshift. More specifically, when it is difficult for the electric motor 6 to output the upper limit torque or when the motor output system has a failure, the lowest gear is the first gear (the mechanically lowest possible gear), and upon start-up of the vehicle, the vehicle ECU 22 sets the gear of the transmission 8 to the first gear (the mechanically lowest possible gear) to start traveling of the vehicle. Therefore, in the present embodiment, the first gear (the mechanically lowest possible gear) corresponds to the first gear (the lowest gear actionable due to the second shift map that is used when the output limit detection unit determines that the generable output torque of the electric motor is limited to the limited torque by the output limiting unit) of the present invention.

In addition, FIG. 4 shows the respective upshift lines of the gear shift map SU1 for upshift as indicated by the dotted lines. As shown in FIG. 4, in comparison to the upshift lines of the gear shift map SU1, the corresponding upshift lines of the gear shift map SU2 for upshift are all set so that the transmission 8 is upshifted at a high-speed side for the same depression amount of the accelerator pedal 30. In other words, when using the gear shift map SU2 for upshift, in accordance with changes in the operating state of the vehicle, the transmission 8 is upshifted later than the case where the gear shift map SU1 for upshift is used.

Figure 5:
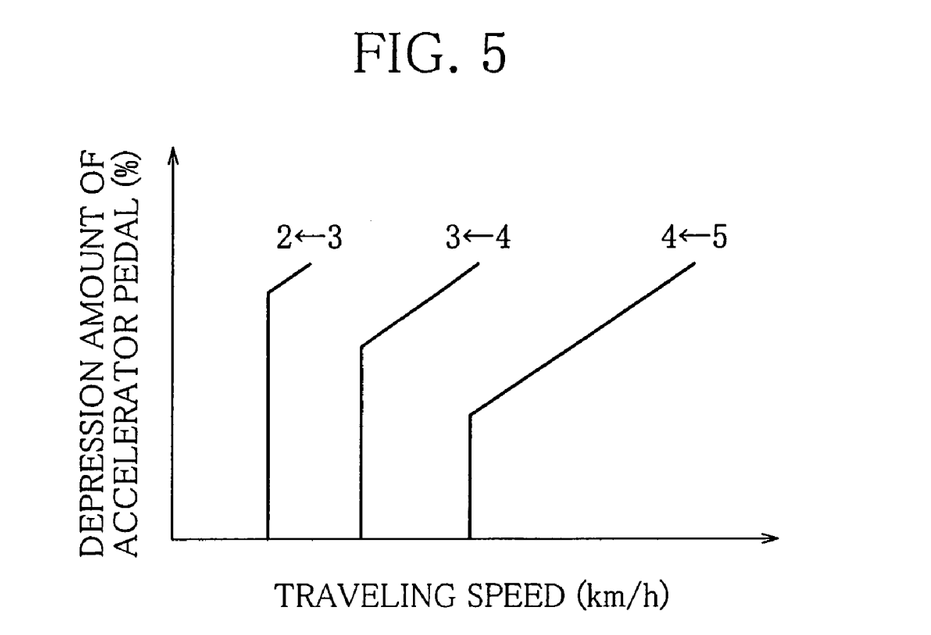
FIG. 5 is a diagram showing a gear shift map SD1 for downshift.

FIG. 5 shows a gear shift map SD1 for downshift, which is selected when the electric motor 6 is capable of outputting the upper limit torque and the motor output system is normal. As shown in FIG. 5, for the gear shift map SD1, a downshift line (4←5) from the fifth gear to the fourth gear, a downshift line (3←4) from the fourth gear to the third gear, and a downshift line (2←3) from the third gear to the second gear are set in accordance with the depression amount of the accelerator pedal 30 and the traveling speed of the vehicle.

Therefore, when a change in the operating state of the vehicle causes a point determined by the depression amount of the accelerator pedal 30 and the traveling speed to move across the downshift line (4←5) from the fifth gear to the fourth gear from right to left on the diagram, the vehicle ECU 22 downshifts the transmission from the fifth gear to the fourth gear. In addition, the procedures for the downshift line (3←4) from the fourth gear to the third gear and the downshift line (2←3) from the third gear to the second gear are similar to that of the downshift line (4←5) from the fifth gear to the fourth gear. More specifically, when a point determined by the depression amount of the accelerator pedal 30 and the traveling speed of the vehicle moves across each downshift line from right to left of the diagram, a corresponding downshift is performed.

When the electric motor 6 is capable of outputting the upper limit torque and the motor output system is normal, the downshift of the transmission 8 is only performed down to the second gear, as shown in FIG. 5. Therefore, as described earlier, at the next start-up of the vehicle, the vehicle ECU 22 sets the gear of the transmission 8 to the second gear to start traveling of the vehicle.

Figure 6:
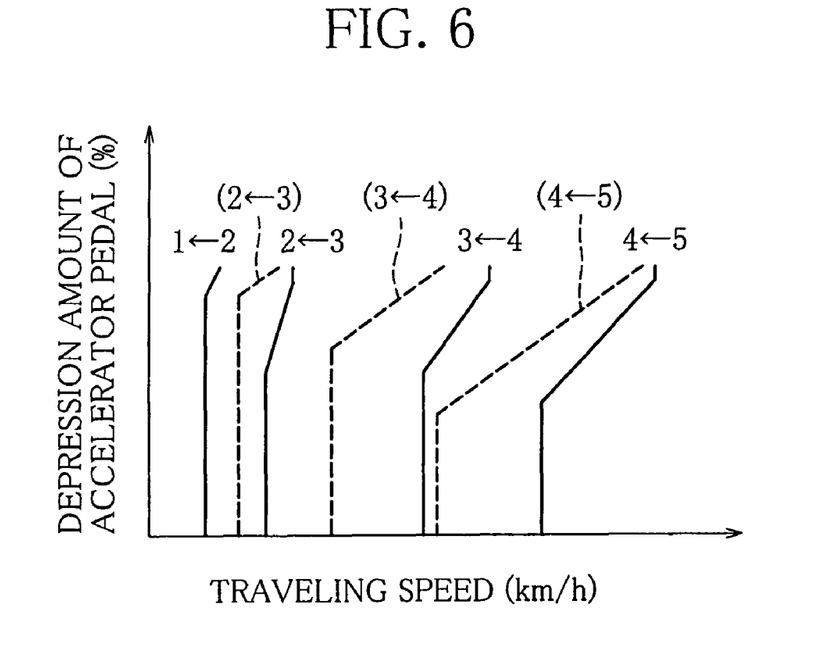
FIG. 6 is a diagram showing a gear shift map SD2 for downshift.

In comparison, FIG. 6 shows a gear shift map SD2 for downshift, which is used when it is difficult for the electric motor 6 to output the upper limit torque or when the motor output system has a failure. For the gear shift map SD2, a downshift line (4←5) from the fifth gear to the fourth gear, a downshift (3←4) line from the fourth gear to the third gear, a downshift line (2←3) from the third gear to the second gear and a downshift line (1←2) from the second gear to the first gear are set as indicated by the solid lines in FIG. 6, in accordance with the depression amount of the accelerator pedal 30 and the traveling speed of the vehicle.

When this gear shift map is used, the transmission 8 is downshifted in the same manner as the case where the gear shift map SD1 for downshift is used. However, as shown in FIG. 6, a downshift line (1←2) from the second gear to the first gear, which is not included in the gear shift map SD1 for downshift, is set for the gear shift map SD2 for downshift. Therefore, when it is difficult for the electric motor 6 to output the upper limit torque or when the motor output system has a failure, the downshift of the transmission 8 is performed down to the first gear. As described earlier, at the next start-up of the vehicle, the vehicle ECU 22 sets the gear of the transmission 8 to the first gear to start traveling of the vehicle.

In addition, FIG. 6 shows the respective downshift lines of the gear shift map SD1 for downshift as indicated by the dotted lines. In comparison to the downshift lines of the gear shift map SD1, the corresponding downshift lines of the gear shift map SD2 for downshift are all set so that the transmission 8 is downshifted at a high-speed side for the same depression amount of the accelerator pedal 30. In other words, when using the gear shift map SD2 for downshift, in accordance with changes in the operating state of the vehicle, the transmission 8 is downshifted earlier than the case where the gear shift map SD1 for downshift is used.

By selecting and using the respective gear shift maps set as described above, driving force is transmitted to the driving wheels 16 as described below.

In the event that the gear shift map SU1 for upshift and the gear shift map SD1 for downshift are selected by the switching control of the gear shift maps because the electric motor 6 is capable of outputting the upper limit torque and the motor output system is normal, when the driver performs start-up operations of the vehicle as described above, the vehicle ECU 22 disengages the clutch 4 and sets the gear of the transmission 8 to the second gear according to the selected gear shift maps. The vehicle ECU 22 then sets an output torque to be generated by the electric motor 6 when the gear is set to the second gear based on a driving torque to be transmitted to the driving wheel 16, which is set according to the depression amount of the accelerator pedal 30. In accordance with the set driving torque of the electric motor 6, the inverter ECU 26 controls the inverter 20 and thereby the driving force of the electric motor 6 is transmitted to the driving wheels 16 through the transmission 8. As a result, the vehicle starts traveling.

In this manner, when the electric motor 6 is capable of outputting the upper limit torque and the motor output system is normal, the vehicle ECU 22 sets the gear of the transmission 8 to the second gear and cause the vehicle to start traveling by means of the electric motor 6. This enables smooth start-up of the vehicle.

When the vehicle accelerates after the start-up, and the revolution speed of the electric motor 6 rises to the vicinity of the idling speed of the engine 2, it is possible to engage the clutch 4 to transmit the driving force of the engine 2 to the driving wheels 16. The vehicle ECU 22 determines a driving torque to be transmitted to the driving wheels 16 for further acceleration and subsequent traveling of the vehicle. Based upon the determined driving torque, the vehicle ECU 22 then obtains a required torque to be outputted from the engine 2 and the motor 6 according to the gear currently used in the transmission 8, and appropriately divides the required torque between an engine 2 side and a electric motor 6 side based on the operating state of the vehicle.

When the vehicle ECU 22 divides the required torque between the engine 2 and the electric motor 6, the vehicle ECU 22 first determines the output torque of the engine 2 according to the revolution speed of the engine 2, and if the determined output torque of the engine 2 is below the required torque, the vehicle ECU 22 sets the deficiency thereof as the output of the electric motor 6. At this point, in consideration of the exhaust emission characteristic of the engine 2, in a relatively low engine revolution speed range, the output torque of the engine 2 is limited within a torque range where the output torque is equal to or lower than a predetermined allowable torque and where NOx emission of the engine 2 is low. Therefore, the vehicle ECU 22 controls the engine 2 and the electric motor 6 so that the required torque is solely obtained from the engine 2 until the required torque exceeds the allowable torque. If the required torque exceeds the allowable torque, the vehicle ECU 22 controls the engine 2 and the electric motor 6 so that the engine 2 outputs the allowable torque and, at the same time, the deficiency is outputted from the electric motor 6.

In addition, during traveling of the vehicle as described above, the vehicle ECU 22 upshifts/downshifts the transmission 8 in accordance with the depression amount of the accelerator pedal 30 detected by the accelerator opening sensor 32 and the traveling speed detected by the vehicle speed sensor 34, based on the selected gear shift map SU1 for upshift and the gear shift map SD1 for downshift. At this point, the vehicle ECU 22 controls the clutch 4 as necessary.

More specifically, as described above, when a point determined by the depression amount of the accelerator pedal 30 and the traveling speed of the vehicle moves across an upshift line of the gear shift map SU1 for upshift shown in FIG. 3, the transmission 8 is upshifted. When the point moves across a downshift line of the gear shift map SD1 for downshift shown in FIG. 5, the transmission 8 is downshifted.

Therefore, in the event that the vehicle starts up and accelerates, the transmission 8 is sequentially upshifted in accordance with the increase in traveling speed. At this point, since the gear for start-up of the vehicle is set to the second gear as described above, the number of upshifts required to reach the fifth gear is less than that in the case where the gear for start-up is set to the first gear, thereby enabling smooth acceleration.

On the other hand, in the event that the gear shift map SU2 for upshift and the gear shift map SD2 for downshift are selected by the switching control of the gear shift maps because it is difficult for the electric motor 6 to output the upper limit torque or the motor output system has a failure, when the driver performs start-up operations of the vehicle as described above, the vehicle ECU 22 disengages the clutch 4, and sets the gear of the transmission 8 to the first gear according to the selected gear shift maps.

The vehicle ECU 22 controls the engine 2 and the electric motor 6 in different ways for the case where it is difficult for the electric motor 6 to output the upper limit torque and the case where the motor output system has a failure.

If it is difficult for the electric motor 6 to output the upper limit torque, the vehicle ECU 22 sets an output torque of the electric motor 6 based on a driving torque to be transmitted to the driving wheel 16, which is set according to the depression amount of the accelerator pedal 30. In this case, since the electric motor 6 is in a state where it is unable to output a torque up to the upper limit torque, the output torque of the electric motor 6 is limited to a limited torque that is lower than the upper limit torque, in accordance with the fact based on which it is judged in Step S1 in FIG. 2 that the electric motor 6 is unable to output the upper limit torque.

However, since the gear used in the transmission 8 in this case is the first gear, a driving torque that is equivalent to that in the case where the gear of the transmission 8 is set to the second gear can be transmitted to the driving wheels 16 by outputting smaller torque from the electric motor 6 in comparison with the case where the gear of the transmission 8 is set to the second gear. Therefore, it is possible to transmit the driving force necessary for start-up of the vehicle to the driving wheels 16 even when the output torque of the electric motor 6 is limited to a limited torque that is lower than the upper limit torque. As a result, it is possible to prevent deterioration of driving performance and driving feeling due to insufficient driving force at the start-up of the vehicle.

In accordance with the driving torque of the electric motor 6 set in this manner, the inverter ECU 26 controls the inverter 20 so that the driving force of the electric motor 6 is transmitted to the driving wheels 16 through the transmission 8, and the vehicle starts traveling.

When the vehicle accelerates after the start-up, and the revolution speed of the electric motor 6 rises to the vicinity of the idling revolution speed of the engine 2, it is possible to engage the clutch 4 to transmit the driving force of the engine 2 to the driving wheels 16. The vehicle ECU 22 determines the driving torque to be transmitted to the driving wheels 16 as described above. Furthermore, based on this driving torque, the vehicle ECU 22 obtains a required torque to be outputted from the engine 2 and the electric motor 6, and appropriately divides the required torque between the engine 2 and the electric motor 6.

In addition, the vehicle ECU 22 upshifts/downshifts the transmission 8 in accordance with the changes in the depression amount of the accelerator pedal 30 detected by the accelerator opening sensor 32 and the traveling speed detected by the vehicle speed sensor 34, based on the selected gear shift map SU2 for upshift and the gear shift map SD2 for downshift. Moreover, the vehicle ECU 22 controls the clutch 4 as necessary.

More specifically, as described above, when a point determined by the depression amount of the accelerator pedal 30 and the traveling speed moves across a upshift line of the gear shift map SU2 for upshift shown in FIG. 4, the transmission 8 is upshifted. When the point moves across a downshift line of the gear shift map SD2 for downshift shown in FIG. 6, the transmission 8 is downshifted.

In this case, in comparison to the gear shift map SU1 for upshift and the gear shift map SD1 for downshift, the gear shift map SU2 for upshift and the gear shift map SD2 for downshift are set so that the transmission 8 is upshifted later and the transmission 8 is downshifted earlier in response to the changes in the depression amount of the accelerator pedal 30 and the traveling speed. Therefore, the engine 2 and the electric motor 6 are used in a relatively high-revolution side. As a result, the sum of the output torques of the engine 2 and the electric motor 6 obtained in accordance with the gear currently in use based on the driving torque to be transmitted to the driving wheels 16 to drive the vehicle is lower than that in the case where the electric motor 6 is capable of outputting the upper limit torque.

Therefore, it is possible to transmit the driving force necessary for driving of the vehicle to the driving wheels 16 even when the output torque of the electric motor 6 is limited to a limited torque that is lower than the upper limit torque, as described above. Consequently, it is possible to prevent deterioration of driving performance and driving feeling due to insufficient driving force.

When the vehicle ECU 22 divides the required torque between the engine 2 and the electric motor 6, the vehicle ECU 22 first determines output torque of the engine 2 according to the revolution speed of the engine 2 in the same manner as in a case where the electric motor 6 is capable of outputting the upper limit torque. If the output torque of the engine 2 is below the required torque, the vehicle ECU 22 sets the deficiency thereof as the output torque of the electric motor 6.

Figure 7:
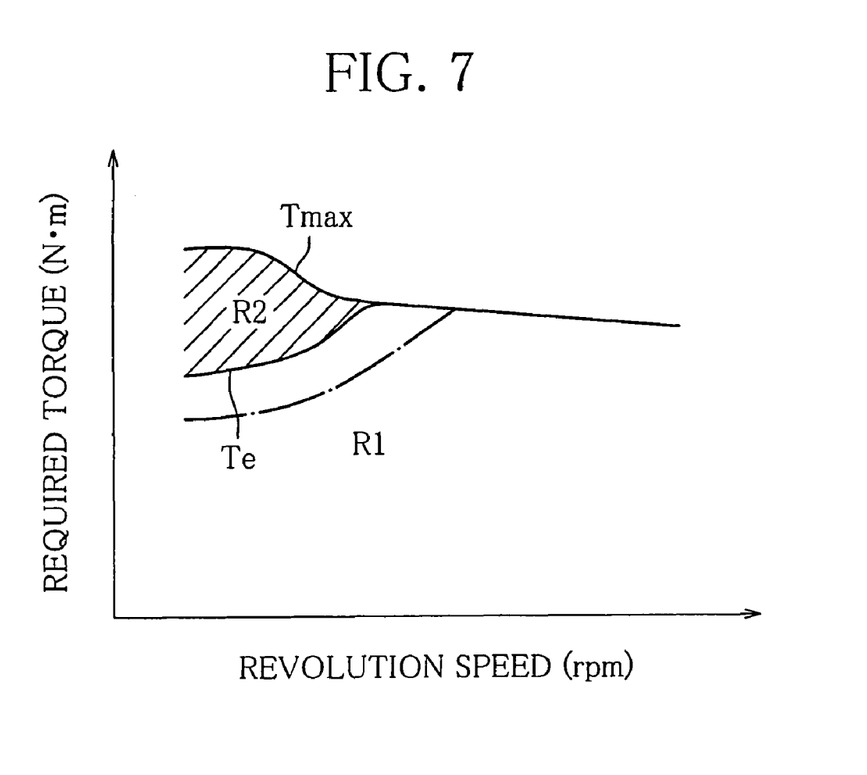
FIG. 7 is a diagram showing output power ranges of an engine and an electric motor.

When the vehicle ECU 22 divides the torque after the revolution speed of the electric motor 6 rises to or exceeds the vicinity of the idling speed of the engine 2 and the clutch 4 is engaged as described above, the vehicle ECU 22 uses a control map shown in FIG. 7. As shown in FIG. 7, this control map defines torque output ranges of the engine 2 and the electric motor 6 according to the revolution speed of the electric motor 6 and the required torque. More specifically, in this control map, a range below an upper limit value Tmax of the required torque is divided into an output range R1 in which the required torque is solely obtained from the engine 2, and an output range R2 in which the required torque is obtained from both the engine 2 and the electric motor 6. Since the clutch 4 is engaged at this point, the revolution speed of the electric motor 6 coincides with the revolution speed of the engine 2.

A boundary between the output range R1 and the output range R2 corresponds to a maximum torque Te that can be outputted by the engine 2 at each revolution speed. Therefore, the vehicle ECU 22 controls the engine 2 and the electric motor 6 so that the required torque is solely obtained from the engine 2 until the required torque exceeds the maximum output torque of the engine 2. When the required torque exceeds the maximum output torque of the engine 2, the vehicle ECU 22 controls the engine 2 and the electric motor 6 so that the engine 2 outputs the then maximum torque and, at the same time, the deficiency with respect to the required torque is outputted from the electric motor 6.

If the electric motor 6 is capable of outputting the upper limit torque, as described above, in consideration of the exhaust emission characteristic of the engine 2, the output torque of the engine 2 will be limited to a torque that is equal to or lower than an allowable torque. This allowable torque is represented by a chain line in FIG. 7.

As shown in FIG. 7, the output torque of the engine 2 is limited to a torque that is equal to or lower than the allowable torque when it is difficult for the motor to output the upper limit torque, whereas the engine 2 is allowed to output up to the maximum torque Te when the electric motor 6 is capable of outputting the upper limit torque. By so doing, the region in which output torque of the electric motor 6 is required is reduced to the low-speed side in the case where it is difficult for the electric motor 6 to output the upper limit torque.

By setting such an output range, the vehicle ECU 22 reduces the load of the electric motor 6 as much as possible in the event that it is difficult for the electric motor 6 to output the upper limit torque. Particularly, in the case where the output of the electric motor 6 is limited due to a decline in the SOC, it is possible to suppress further decline in the SOC and to recover the SOC promptly.

If it is difficult for the electric motor 6 to output the upper limit torque, the engine 2 and the electric motor 6 is operated on a high-revolution side by selecting the gear shift map SU2 for upshift and the gear shift map SD2 for downshift, as described earlier. In addition to this, since the output range of electric motor 6 is reduced and shifts to a low-speed side as described above, the effect of the output limitation imposed on the electric motor 6 decreases.

As a result, it is possible to reliably prevent situations involving insufficient power even if the output of the electric motor 6 is significantly limited.

On the other hand, in the case where it is detected that the motor output system has a failure, the gear shift map SU2 for upshift and the gear shift map SD2 for downshift are selected by the switching control of the gear shift maps, as described above. When the driver performs start-up operations of the vehicle as described before, the vehicle ECU 22 disengages the clutch 4, and at the same time sets the gear of the transmission 8 to the first gear according to the selected gear shift maps.

In this case, since the electric motor 6 is not operated, the vehicle ECU 22 instructs the engine ECU 24 to output a torque corresponding to the depression amount of the accelerator pedal 30 from the engine 2, and at the same time, controls the clutch 4 to be engaged partially. Upon receiving the instruction from the vehicle ECU 22, the engine ECU 24 controls the engine 2 so that the engine 2 outputs a torque in accordance with the depression amount of the accelerator pedal 30 detected by the accelerator opening sensor 32 and the revolution speed of the engine 2. The driving torque of the engine 2 is transmitted to the driving wheels 16 through the clutch 4 in a partially engaged state and the transmission 8, and thereby the vehicle starts traveling.

Although driving force will not be transmitted from the electric motor 6 to the driving wheels 16, since the gear used in the transmission 8 at this point is the first gear, driving force necessary for start-up of the vehicle can be transmitted to the driving wheels 16. As a result, it is possible to prevent deterioration of driving performance and driving feeling due to insufficient driving force upon vehicle start-up.

When the vehicle accelerates after the start-up and the revolution speed of the electric motor 6 rises to the vicinity of the idling speed of the engine 2, the vehicle ECU 22 completely engages the clutch 4, and determines a driving torque to be transmitted to the driving wheels 16 for further acceleration and subsequent traveling of the vehicle. Subsequently, based on this driving torque, the vehicle ECU 22 obtains a required torque to be outputted from the engine 2 in accordance with the gear currently used in the transmission 8, and instructs the engine ECU 24 to have the engine 2 output this required torque.

In addition, the vehicle ECU 22 upshifts/downshifts the transmission 8 in accordance with the changes in the depression amount of the accelerator pedal 30 detected by the accelerator opening sensor 32 and the traveling speed detected by the vehicle speed sensor 34, based on the selected gear shift map SU2 for upshift and the gear shift map SD2 for downshift. At this point, the vehicle ECU 22 controls the clutch 4 as necessary.

More specifically, as described above, when a point determined by the depression amount of the accelerator pedal 30 and the traveling speed of the vehicle moves across an upshift line of the gear shift map SU2 for upshift shown in FIG. 4, the transmission 8 is upshifted. When the point moves across a downshift line of the gear shift map SD2 for downshift shown in FIG. 6, the transmission 8 is downshifted.

As described earlier, in comparison to the gear shift map SU1 for upshift and the gear shift map SD1 for downshift, the gear shift map SU2 for upshift and the gear shift map SD2 for downshift are set so that the transmission 8 is upshifted later and the transmission 8 is downshifted earlier in response to the changes in the depression amount of the accelerator pedal 30 and the traveling speed of the vehicle. Therefore, it is possible to secure driving force necessary for acceleration even if driving force can not be obtained from the electric motor 6 and the driving wheels 16 is driven solely by the driving force of the engine 2. As a result, it is possible to suppress deterioration of driving performance and driving feeling due to insufficient driving force.

In addition to the switching control of the gear shift maps described above, the vehicle ECU 22 also switches the control of the clutch 4, which is performed when the depression of the accelerator pedal 30 is released and the vehicle decelerates, depending on whether or not the motor output system has a failure.

More specifically, during deceleration of the hybrid electric vehicle 1, it is possible to appropriately decelerate the vehicle using the regenerative braking force of the electric motor 6 as described above. If the motor output system has a failure, however, it is unable to use such a regenerative braking force. For this reason, by switching the control of the clutch 4, the vehicle ECU 22 ensures that the vehicle is appropriately decelerated even if the motor output system has a failure.

Figure 8:
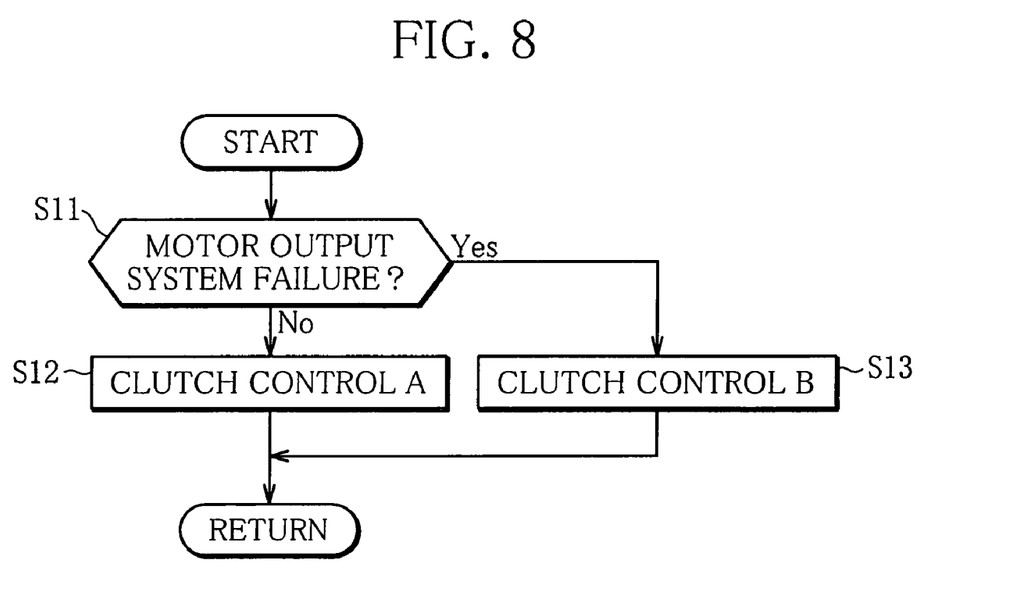
FIG. 8 is a flowchart showing a switching control of a clutch control performed in the hybrid electric vehicle shown in FIG. 1.

Such switching control of the clutch control by the vehicle ECU 22 is performed at predetermined control periods according to a flowchart shown in FIG. 8.

Upon commencement of switching control of the clutch control, the vehicle ECU 22 judges in Step S11 (failure detection means) whether or not the motor output system has a failure based on the information from the inverter ECU 26 and the battery ECU 28 in the same manner as the procedure of Step S2 in the switching control of the gear shift maps shown in FIG. 2.

If the vehicle ECU 22 judges in Step S11 that the motor output system has no failure or, in other words, that the motor output system is normal, the vehicle ECU 22 selects a clutch control A in Step S12, and then concludes the present control period. On the other hand, if the vehicle ECU 22 judges in Step S11 that the motor output system has a failure, the vehicle ECU 22 selects a clutch control B in Step S13, and then concludes the present control period.

By repeating the judgment of Step S11 in this manner for each control period, the vehicle ECU 22 selects either the clutch control A or the clutch control B depending on whether or not the motor output system has a failure.

During deceleration of the vehicle, in combination with the clutch control thus selected, the vehicle ECU 22 controls the engine 2 and the electric motor 6 as described below.

In the event that the depression of the accelerator pedal 30 is released when the motor output system is normal, the vehicle ECU 22 sets a decelerating torque necessary for appropriately decelerating the vehicle as a required decelerating torque based on the revolution speed of the electric motor 6 detected by a revolution speed sensor 36 and the gear currently used in the transmission 8.

Figure 9:
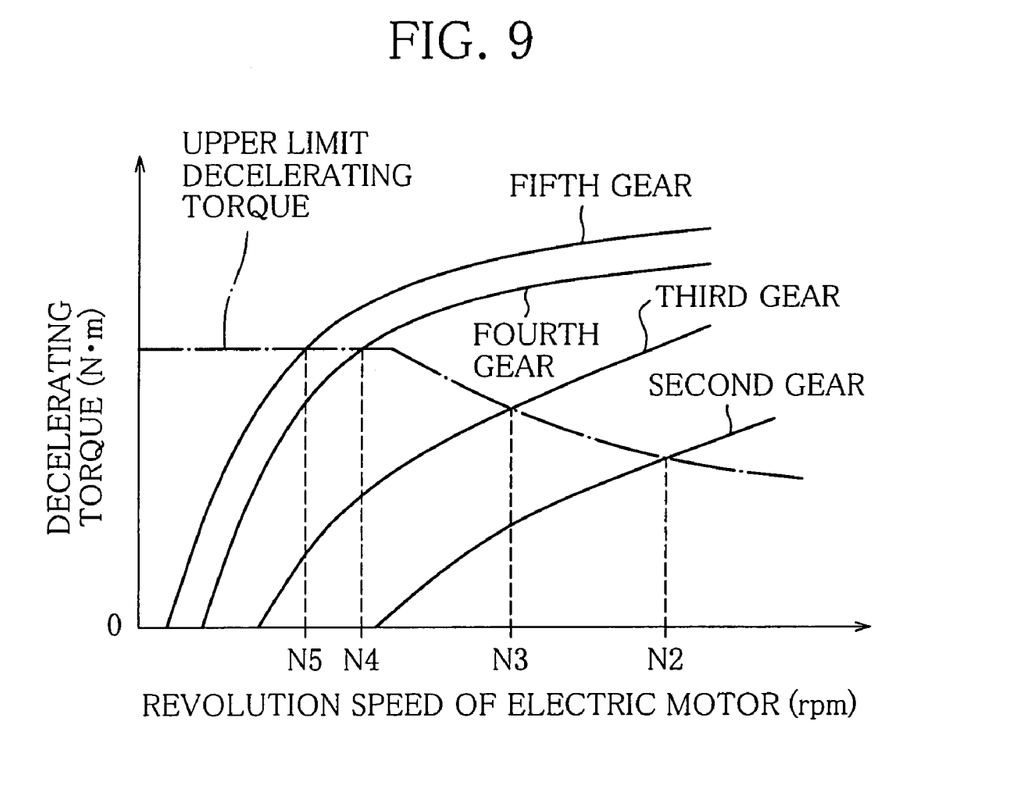
FIG. 9 is a diagram showing a relationship between an upper limit decelerating torque of an electric motor and a required decelerating torque.

The required decelerating torque is individually set for each gear of the transmission 8, as indicated by the solid lines in FIG. 9. Required decelerating torques corresponding to the respective gears increase as the revolution speed of the electric motor 6 increases. In addition, as shown in FIG. 9, the required decelerating torques are set so that the higher the gear, the greater the required decelerating torque.

Furthermore, the vehicle ECU 22 sets an upper limit value of a regenerative braking torque that can be generated by the electric motor 6 at the revolution speed of the electric motor 6 detected by the revolution speed sensor 36 as an upper limit decelerating torque. This upper limit decelerating torque is determined based on the specifications of the electric motor 6 according to the revolution speed of the electric motor 6. As indicated by the chain line in FIG. 9, the upper limit decelerating torque has a characteristic that the upper limit decelerating torque has a constant value in a low revolution speed range and decreases as the revolution speed of the electric motor 6 increases in a high revolution speed range. Moreover, as shown in FIG. 9, the magnitude correlations between the upper limit decelerating torque and each required decelerating torque corresponding to the respective gears are reversed at each revolution speed from N2 to N5.

If the required decelerating torque is greater than the upper limit decelerating torque having the above characteristics, the regenerative braking torque of the electric motor 6 alone is insufficient in obtaining the required decelerating torque. Therefore, the vehicle ECU 22 engages the clutch 4, and controls the engine 2 and the electric motor 6 so that the required decelerating torque is obtained by combining the decelerating torque of the engine 2 and the decelerating torque of the electric motor 6 attributable to regenerative braking.

On the other hand, if the required decelerating torque is equal to or lower than the upper limit decelerating torque, the required decelerating torque can be solely obtained from the regenerative braking torque of the electric motor 6. Therefore, the vehicle ECU 22 disengages the clutch 4, and controls the electric motor 6 so that the required decelerating torque is solely obtained by the regenerative braking of the electric motor 6.

By performing the control in this manner, the vehicle ECU 22 uses the regenerative braking of the electric motor 6 to recover energy as much as possible during deceleration. Thus, in the clutch control A that is selected when the motor output system is normal, the vehicle ECU 22 controls the engagement/disengagement state of the clutch 4 according to the magnitude correlation between the required decelerating torque and the upper limit decelerating torque.

On the other hand, in a case where it is detected that the motor output system has a failure, regenerative braking force can not be obtained from the electric motor 6. Therefore, when depression of the accelerator pedal 30 is released, the vehicle ECU 22 engages the clutch 4. In addition, the vehicle ECU 22 instructs the engine ECU 24 to perform deceleration operations of the engine 2 such as stopping the fuel supply to the engine 2, and in the case where an exhaust brake has been provided, operating the exhaust brake.

Following the instructions from the vehicle ECU 22, the engine ECU 24 performs deceleration operations of the engine 2 by stopping the fuel supply to the engine 2, and when the exhaust brake has been provided, by operating the exhaust brake.

As a result, the decelerating torque of the engine 2 is transmitted from the transmission 8 to the driving wheels 16 through the clutch 4 so that the vehicle is decelerated. At this point, since the clutch 4 is engaged, the revolution speed detected by the revolution speed sensor 36 is equal to the rotation of the engine 2. When the traveling speed decreases along with the deceleration of the vehicle and the vehicle ECU 22 detects that the revolution speed of the engine 2 has dropped to the vicinity of the idling speed based on the revolution speed detected by the revolution speed sensor 36, the vehicle ECU 22 disengages the clutch 4 in order to prevent the revolution speed of the engine 2 from dropping below the idling speed.

As described above, in the clutch control B that is selected when a failure is detected in the motor output system, the vehicle ECU 22 maintains engagement of the clutch 4 until the revolution speed of the engine 2 has dropped to the vicinity of the idling speed, and the vehicle is decelerated by the decelerating torque of the engine 2.

Consequently, even in the event that the motor output system has a failure and the regenerative braking force of the electric motor 6 can not be used, it is possible to continuously transmit the decelerating torque necessary for the appropriate deceleration of the vehicle to the driving wheel 16, in combination with the use of the gear shift map SD2 for downshift in which the transmission 8 is downshifted earlier as described above. As a result, the vehicle will be able to decelerate in a preferable manner.

In the above, the control device for a hybrid electric vehicle according to an embodiment of the present invention have been described. However, it should be noted that the present invention is not limited to the embodiment described above.

For instance, in the above embodiment, the vehicle ECU 22 similarly selects the gear shift map SU2 for upshift and the gear shift map SD2 for downshift in both cases where it is difficult for the electric motor 6 to output the upper limit torque and where the motor output system has a failure. However, in the case where the motor output system has a failure, since only the driving torque of the engine 2 can be transmitted to the driving wheels 16, the present invention may be arranged so that gear shift maps are selected which enable downshift to be performed earlier and upshift to be performed later than the case where it is difficult for the electric motor 6 to output the upper limit torque. Such an arrangement will enable driving force necessary for acceleration to be secured in a more preferable manner. As a result, it is possible to suppress declines in driving performance and driving feeling due to insufficient driving force in a more reliable manner.

In the above embodiment, the gear of the transmission 8 for start-up of the vehicle is set to the first gear in the case where it is difficult for the electric motor 6 to output the upper limit torque or in the case where the motor output system has a failure, and on the other hand, the gear for start-up of the vehicle is set to the second gear in the case where the electric motor 6 is capable of outputting the upper limit torque and the motor output system is normal. However, the gear for start-up of the vehicle in the each case is not limited to the above. The gear for start-up of the vehicle may be set depending on the specifications of the vehicle. In this case, the gear for start-up of the vehicle in the case where it is difficult for the electric motor 6 to output the upper limit torque or in the case where the motor output system has a failure is set to a lower gear as compared with the gear for start-up of the vehicle in the case where the electric motor 6 is capable of outputting the upper limit torque and the motor output system is normal.

In the above embodiment, the vehicle ECU 22 judges that it is difficult for the electric motor 6 to output the upper limit torque when the output torque of the electric motor 6 is actually limited to a limited torque that is lower than the upper limit torque. However, based on the information from the battery ECU 28, the vehicle ECU 22 may judge that it is difficult for the electric motor 6 to output the upper limit torque when the SOC of the battery 18 lowers below a predetermined lower limit SOC (e.g. 30%). In this case, by setting the lower limit SOC that is somewhat larger than the SOC at which the electric motor 6 actually becomes incapable of outputting the upper limit torque, it is possible to switch the gear shift maps while predicting actual reductions in the output of the electric motor 6. As a result, it is possible to prevent temporary deficiencies in driving force due to delays in switching the gear shift maps.

Alternatively, based on the information from the battery ECU 28, the vehicle ECU 22 may judge that it is difficult for the electric motor 6 to output the upper limit torque when an allowable output value, which is an upper limit of the electric power that can be currently outputted from the battery 18, drops below a predetermined output power. In this case, it is also possible to switch the gear shift maps while predicting actual reductions in the output of the electric motor 6. As a result, it is possible to prevent temporary deficiencies in driving force due to delays in switching the gear shift maps may be prevented.

In the above embodiment, the electric motor 6 is disposed between the clutch 4 and the transmission 8, but the location of the electric motor 6 is not limited to the above. A similar effect can be obtained with any hybrid electric vehicle in which the driving force of the engine 2 and the driving force of the electric motor 6 can be transmitted to the driving wheels 16 respectively, such as a hybrid electric vehicle in which the electric motor 6 is disposed between the engine 2 and the clutch 4.

In the above embodiment, the transmission 8 is configured as an automatic transmission having five forward gears. However, the number of the gears and the type of the automatic transmission is not limited to the above. For instance, a continuously variable transmission may be used instead.

In the above embodiment, the revolution speed of the electric motor 6 detected by the revolution speed sensor 36 is used. However, an output revolution speed of the transmission 8 may alternatively be detected and converted into the revolution speed of the electric motor 6 using a gear ratio currently used in the transmission 8. Otherwise, the revolution speed of the electric motor 6 may be obtained from a quantity that changes according to the revolution speed of the electric motor 6.

In the above embodiment, the engine 2 is configured as a diesel engine, but the type of the engine is not limited to the above, and a gasoline engine or the like may be used instead.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for a hybrid electric vehicle arranged such that a driving force of an engine and a driving force of an electric motor can be transmitted to driving wheels through an automatic transmission having a plurality of forward gears, the control device comprising:
    an output limiting unit that limits a generable torque of the electric motor to a limited torque that is lower than an upper limit torque predetermined as a generable maximum torque of the electric motor;
    an output limit detection unit that determines whether or not the output limiting unit actually limits the generable torque of the electric motor to the limited torque; and
    a control unit that controls the automatic transmission to upshift a forward gear according to an increase of running speed of the vehicle and downshift the forward gear according to a decrease of the running speed of the vehicle based on a gear shift map, wherein
    when the output limit detection unit determines that the generable output torque of the electric motor is not limited to the limited torque by the output limiting unit, the control unit controls the automatic transmission using a first shift map as the gear shift map, and, when the output limit detection unit determines that the generable output torque of the electric motor is limited to the limited torque by the output limiting unit, the control unit controls the automatic transmission using a second shift map as the gear shift map, the second shift map being set so that an upshift is carried out on a higher speed side as compared with a corresponding upshift carried out by using the first shift map and a downshift is carried out on a higher speed side as compared with a corresponding downshift carried out by using the first shift map.

2. The control device for a hybrid electric vehicle according to claim 1, further comprising:
    a storage rate detection unit that detects a storage rate of a battery that supplies electric power to the electric motor, wherein:
    the output limiting unit limits the generable output torque to the limited torque when the storage rate of the battery detected by the storage rate detection unit decreases below a predetermined lower limit storage rate.

3. The control device for a hybrid electric vehicle according to claim 1, wherein:
    a first gear of the automatic transmission is set as a lowest forward gear in the second shift map; and
    a second gear of the automatic transmission is set as the lowest forward gear in the first shift map, the second gear being a higher speed side forward gear of the transmission as compared with the first gear.

4. The control device for a hybrid electric vehicle according to claim 1, further comprising:
    a failure detection unit that detects a failure of the electric motor, wherein:
    when the failure of the electric motor is detected by the failure detection unit, the control unit controls the automatic transmission using the second shift map.

5. The control device for a hybrid electric vehicle according to claim 4, further comprising:
    a clutch capable of cutting off the driving force transmitted from the engine to the automatic transmission; and
    a revolution speed detection unit that detects a revolution speed of the electric motor, wherein:
    the control unit includes a torque control section; and
    in the event that the failure is not detected by the failure detection unit during deceleration of the vehicle, the torque control section sets a regenerative braking torque that is generated by the electric motor as an upper limit decelerating torque and a decelerating torque necessary for the deceleration of the vehicle as a required decelerating torque in accordance with the revolution speed detected by the revolution speed detection unit, wherein
    in the event that the failure is not detected by the failure detection unit during deceleration of the vehicle, the torque control section disengages the clutch and controls the electric motor so that the electric motor generates the required decelerating torque when the required decelerating torque is equal to or lower than the upper limit decelerating torque, and, the torque control section engages the clutch and controls the engine and the electric motor so that a sum of a decelerating torque from the engine and a regenerative braking torque from the electric motor is equal to the required decelerating torque when the required decelerating torque is greater than the upper limit decelerating torque; and in the event that the failure is detected by the failure detection unit during the deceleration of the vehicle, the torque control section maintains engagement of the clutch at least until the revolution speed of the engine decreases to the vicinity of an idling speed of the engine.

6. A control device for a hybrid electric vehicle arranged such that a driving force of an engine and a driving force of an electric motor is transmitted to driving wheels through an automatic transmission having a plurality of forward gears, the control device comprising:

an output limit detection unit that determines whether or not the vehicle is in a predetermined state in which it is difficult for the electric motor to output an upper limit torque predetermined as a generable maximum torque; and a control unit that upshifts the forward gear according to an increase of running speed of the vehicle and downshifts the forward gear according to a decrease of the running speed of the vehicle on the basis of a gear shift map, wherein when it is determined by the output limit detection unit that the vehicle is not in the predetermined state, the control unit controls the automatic transmission using a first shift map as the gear shift map, and, when it is determined by the output limit detection unit that the vehicle is in the predetermined state, the control unit controls the automatic transmission using a second shift map as the gear shift map, the second shift map being set so that an upshift is carried out on a higher speed side as compared with a corresponding upshift carried out by using the first shift map, and a downshift is carried out on a higher speed side as compared with a corresponding downshift carried out by using the first shift map, wherein a first gear of the automatic transmission is set as a lowest forward gear in the second shift map; and a second gear of the automatic transmission is set as the lowest forward gear in the first shift map, the second gear being a higher speed side forward gear of the transmission as compared with the first gear.

* * * * *